(No Model.)

J. H. MITCHELL.
KNIFE CLEANING AND FLOURING DEVICE.

No. 472,194. Patented Apr. 5, 1892.

WITNESSES:
John Buckler,
Isabel Chester

INVENTOR
J. H. Mitchell.
BY A. M. Pierce.
ATTORNEY

UNITED STATES PATENT OFFICE.

JAMES HENRY MITCHELL, OF PHILADELPHIA, PENNSYLVANIA.

KNIFE CLEANING AND FLOURING DEVICE.

SPECIFICATION forming part of Letters Patent No. 472,194, dated April 5, 1892.

Application filed December 31, 1891. Serial No. 416,641. (No model.)

*To all whom it may concern:*

Be it known that I, JAMES HENRY MITCHELL, a citizen of the United States, residing at Philadelphia, in the county of Philadelphia and State of Pennsylvania, have invented a new and useful Improvement in Knife Cleaning and Flouring Devices, of which the following is a specification.

My invention relates especially to means and mechanism employed with bakers' machinery, and has for its object the provision of an effective method and device for cleaning and flouring the knife employed for dividing dough upon a moving belt.

To attain the desired end my invention consists, essentially, in the combination, with a vertically-movable knife, of a flour-box having a longitudinal slot in its bottom, through which said knife is arranged to pass, stripping and cleaning lips being located at the sides of said slot beneath the flour-box, all of which will be hereinafter first fully described, and then pointed out in the claims.

Figure 1:
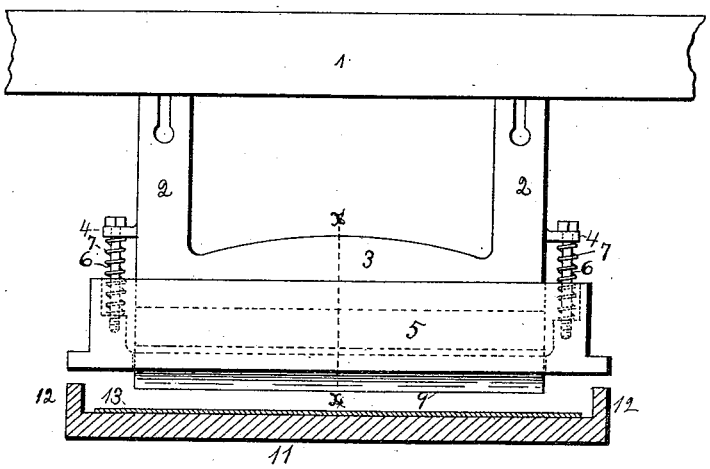
Figure 2:
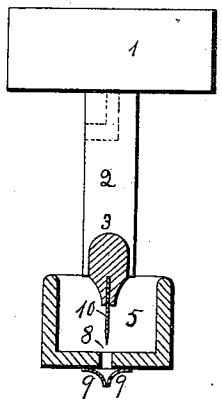

In the accompanying drawings, Figure 1 is a side elevation of my improved knife cleaning and flouring device, and Fig. 2 is a cross-sectional view at line $x\ x$ of Fig. 1.

Similar numerals of reference wherever they occur indicate corresponding parts in both figures.

1 is a vertically-movable bar of a cutter-head of a cake or similar machine.

2 are vertical posts secured thereto and having a connecting-piece 3 passing horizontally therebetween.

4 are ears projecting from each side of the posts 2.

5 is a flour-box supported by bolts 6, arranged to play in the ears 4, the said box being normally forced downward by springs 7.

8 is a longitudinal slot in the bottom of the flour-box, and 9 are lips projecting toward each other at the under side of the flour-box at each side of the slot 8. Secured to the bar 3 is a knife 10, arranged to pass through the slot 8 and between the lips 9 therebeneath.

11 is the bed of the machine, provided with side pieces 12.

13 is a dough-carrying belt arranged in the usual manner.

The operation of my device is as follows: Flour being placed in the box 5 and a vertically-reciprocating movement being given to the cutter-head in any well-known manner, as the head descends the bottom of the flour-box first strikes the side pieces 12. The knife still continues to descend and passes through the flour in the box and projects between the lips 9, its descent continuing until it has cut through the dough upon the belt 13. The return upward movement now takes place, and all adhering dough, &c., is scraped and cleaned from the knife by the lips 9. It will thus be seen that the device keeps the cutting-knife in a clean condition and thoroughly floured, preventing the adhesion of the dough thereto.

Having now fully described my invention, what I claim as new therein, and desire to secure by Letters Patent, is—

1. In a device of the character herein specified, the combination, with a reciprocable cutter-head bearing a cutting-knife, of a flour-box located beneath said knife and having a longitudinal slot in its bottom provided with lips projecting toward each other at the sides of said slot, substantially as shown and described.

2. In a device of the character herein specified, a flour-box movably mounted upon a cutter-head, said box having a slot in its bottom and being provided with lips projecting toward each other at the sides of the slot, in combination with a cutting-knife fixed to the cutter-head and adapted to pass between said lips, substantially as shown and described.

JAMES HENRY MITCHELL.

Witnesses:
FRANK H. MASSEY,
MAURICE R. MASSEY.